(12) United States Patent
Mori et al.

(10) Patent No.: US 11,459,264 B2
(45) Date of Patent: Oct. 4, 2022

(54) METHOD FOR PRODUCING GLASS FILM

(71) Applicant: Nippon Electric Glass Co., Ltd., Shiga (JP)

(72) Inventors: Hiroki Mori, Shiga (JP); Koichi Mori, Shiga (JP); Shuji Akiyama, Shiga (JP); Yasuhiro Uemura, Shiga (JP); Naoyuki Matsumoto, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 584 days.

(21) Appl. No.: 16/481,919

(22) PCT Filed: Jan. 29, 2018

(86) PCT No.: PCT/JP2018/002675
§ 371 (c)(1),
(2) Date: Jul. 30, 2019

(87) PCT Pub. No.: WO2018/147111
PCT Pub. Date: Aug. 16, 2018

(65) Prior Publication Data
US 2019/0375666 A1 Dec. 12, 2019

(30) Foreign Application Priority Data
Feb. 7, 2017 (JP) .............................. JP2017-020277

(51) Int. Cl.
*C03B 9/36* (2006.01)
*C03B 9/38* (2006.01)
(Continued)

(52) U.S. Cl.
CPC .............. *C03B 17/06* (2013.01); *B23K 26/38* (2013.01); *B65G 49/06* (2013.01); *C03B 33/082* (2013.01);
(Continued)

(58) Field of Classification Search
CPC combination set(s) only.
See application file for complete search history.

(56) References Cited

U.S. PATENT DOCUMENTS 8,241,751 B2 * 8/2012 Tomamoto .............. B32B 17/10
428/34.4
2011/0217521 A1 * 9/2011 Teranishi ................ C03B 17/06
428/192
(Continued)

FOREIGN PATENT DOCUMENTS

CN 104768885 7/2015
CN 105164073 12/2015
(Continued)

OTHER PUBLICATIONS

International Search Report dated Mar. 13, 2018 in International (PCT) Application No. PCT/JP2018/002675.
(Continued)

*Primary Examiner* — Alison L Hindenlang
*Assistant Examiner* — Steven S Lee
(74) *Attorney, Agent, or Firm* — Wenderoth, Lind & Ponack, L.L.P.

(57) ABSTRACT

Provided is a method of manufacturing a glass film, including: a conveying step of conveying an elongated glass film (G) along a longitudinal direction thereof; and a cutting step of irradiating the glass film (G) with a laser beam (L) from a laser irradiation apparatus (19) while conveying the glass film (G) through the conveying step, to thereby separate the glass film (G). The cutting step includes generating a thread-like peeled material (Ge) in a helical shape from an end portion of the separated glass film (G) in a width direction. The thread-like peeled material (Ge) has a width (W) of 180

(Continued)

µm or more and 300 µm or less. In addition, the thread-like peeled material (Ge) has a helical diameter (D) of 80 mm or more and 200 mm or less.

4 Claims, 7 Drawing Sheets

(51) Int. Cl.
    *C03B 17/04*     (2006.01)
    *C03B 17/06*     (2006.01)
    *B23K 26/38*     (2014.01)
    *B65G 49/06*     (2006.01)
    *C03B 33/08*     (2006.01)
    *C03B 33/09*     (2006.01)
    *C03B 33/10*     (2006.01)
    *B23K 103/00*     (2006.01)
    *B23K 26/08*     (2014.01)
    *C03B 33/02*     (2006.01)
    *C03B 33/023*     (2006.01)

(52) U.S. Cl.
    CPC .......... *C03B 33/091* (2013.01); *C03B 33/102* (2013.01); *B23K 26/0846* (2013.01); *B23K 2103/54* (2018.08); *C03B 33/0222* (2013.01); *C03B 33/0235* (2013.01)

(56) References Cited

U.S. PATENT DOCUMENTS

| | | | | |
|---|---|---|---|---|
| 2012/0024928 A1* | 2/2012 | Matsumoto | ........... | C03B 35/189 225/2 |
| 2012/0047957 A1* | 3/2012 | Dannoux | ............... | B23K 26/40 65/112 |
| 2012/0318024 A1 | 12/2012 | Mori et al. | | |
| 2014/0182338 A1* | 7/2014 | Abramov | ............ | C03B 33/0215 65/97 |
| 2015/0165548 A1* | 6/2015 | Marjanovic | ........... | C03B 33/091 219/121.73 |
| 2015/0218034 A1* | 8/2015 | Bigelow | ............. | C03B 33/0235 156/271 |
| 2015/0315059 A1* | 11/2015 | Abramov | ............ | C03B 23/0235 65/176 |
| 2016/0176746 A1* | 6/2016 | Hunzinger | ............... | C03B 23/02 65/53 |
| 2016/0272531 A1* | 9/2016 | Inayama | ................ | C03B 33/082 |
| 2016/0272532 A1* | 9/2016 | Fujii | .................... | C03B 33/082 |
| 2018/0134605 A1* | 5/2018 | Aburada | ............... | C03B 33/037 |
| 2019/0152826 A1 | 5/2019 | Ikai et al. | | |

FOREIGN PATENT DOCUMENTS

| | | | | |
|---|---|---|---|---|
| JP | 9-136184 | 5/1997 | | |
| JP | 2001080928 A | * 3/2001 | ............ | C03B 33/09 |
| JP | 2012-526721 | 11/2012 | | |
| JP | 2012-240883 | 12/2012 | | |
| JP | 2017-214240 | 12/2017 | | |
| JP | 2018-24536 | 2/2018 | | |
| WO | 2010/132637 | 11/2010 | | |
| WO | 2014/002685 | 1/2014 | | |
| WO | 2014/052548 | 4/2014 | | |
| WO | 2014/192482 | 12/2014 | | |
| WO | WO-2014192482 A1 | * 12/2014 | ........... | C03B 33/082 |
| WO | WO-2016007448 A1 | * 1/2016 | ............. | B65H 20/32 |

OTHER PUBLICATIONS

Notification of Reason for Refusal dated Jan. 7, 2022 in corresponding Korean Patent Application No. 10-2019-7015255 with English Machine Translation.

International Preliminary Report on Patentability and Written Opinion of the International Searching Authority dated Mar. 13, 2018 in International (PCT) Application No. PCT/JP2018/002675.

Office Action dated May 26, 2021 in Chinese Patent Application No. 201880006983.6, with English language translation of the Search Report.

* cited by examiner

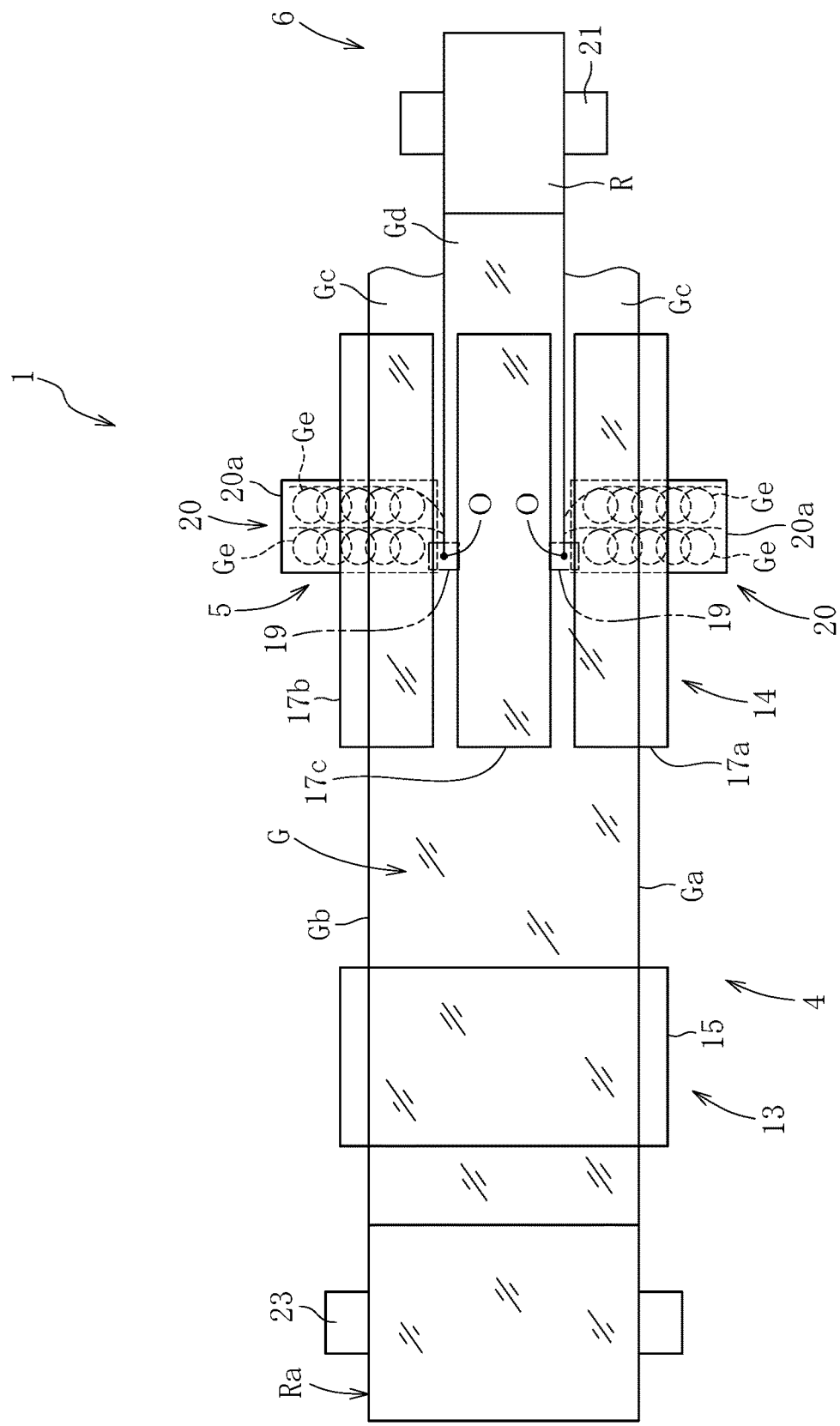

METHOD FOR PRODUCING GLASS FILM

TECHNICAL FIELD

The present invention relates to a method of manufacturing a glass film capable of being taken up into a roll shape.

BACKGROUND ART

As is well known, thinning of glass sheets to be used in flat panel displays (FPD), such as a liquid crystal display and an OLED display, glass sheets to be used in OLED illumination, glass sheets to be used for manufacturing a tempered glass that is a component of a touch panel, and the like, and glass sheets to be used in panels of solar cells, and the like has been promoted in the current circumstances.

For example, in Patent Literature 1, there is disclosed a glass film (thin sheet glass) having a thickness of several hundred micrometers or less. As described also in this literature, this kind of glass film is generally obtained through continuous forming with a forming device employing a so-called overflow down-draw method.

For example, an elongated glass film obtained by the continuous forming by the overflow down-draw method is changed in its conveying direction from a vertical direction to a horizontal direction, and is then continuously conveyed to a downstream side with a lateral conveying unit (horizontal conveying unit) of a conveying device. In the process of the conveyance, both end portions (selvage portions) of the glass film in a width direction are cut and removed. After that, the glass film is taken up into a roll shape with a take-up roller. Thus, a glass roll is formed.

In Patent Literature 1, as a method of cutting both the end portions of the glass film in the width direction, laser cleaving is disclosed. The laser cleaving involves forming an initial crack on the glass film by crack forming means, such as a diamond cutter, and then irradiating the portion with a laser beam to heat the portion, followed by cooling the heated portion by cooling means to develop the initial crack through a thermal stress generated in the glass film, to thereby cut the glass film.

As another cutting method, in Patent Literature 2, there is disclosed a cutting technology for a glass film involving utilizing a so-called peeling phenomenon. The technology involves irradiating the glass film (glass substrate) with a laser beam to melt-cut part of the glass film while conveying the glass film, and moving the melt-cut portion away from a laser beam irradiation region to cool the portion.

In this case, when the melt-cut portion is cooled, a substantially thread-like peeled material (deposit) is generated (for example, see paragraph 0044 and FIG. 3 of Patent Literature 2). A phenomenon in which the thread-like peeled material is peeled off from an end portion of the glass film is generally called peeling. When the thread-like peeled material is generated, a uniform cut surface is formed on the glass film.

CITATION LIST

Patent Literature 1: JP 2012-240883 A
Patent Literature 2: WO 2014/002685 A1

SUMMARY OF INVENTION

Technical Problem

Further, in Patent Literature 2, as a method of removing the thread-like peeled material, for example, blowing off by a gas, suction, and the use of a blush, a baffle plate, or the like are described (see paragraph 0046 of Patent Literature 2).

However, when the thread-like peeled material is removed by the above-mentioned means during cutting of the glass film, there is a risk in that the thread-like peeled material is broken in the middle thereof, and a fragment thereof adheres to the glass film to damage the surface of the glass film. Therefore, it is desired that the thread-like peeled material be continuously collected so that the thread-like peeled material is not broken in the middle thereof. In addition, during the cutting of the glass film through utilization of the peeling phenomenon, when the generation of the thread-like peeled material is interrupted in a glass cutting portion (when the peeling phenomenon stops), glass cutting quality deteriorates in a portion in which the generation of the thread-like peeled material is interrupted, and glass is liable to be broken after the cutting. Therefore, it is desired that the cutting be continued so that the generation of the thread-like peeled material is not interrupted.

The present invention has been made in view of the above-mentioned circumstances, and an object of the present invention is to provide a method of manufacturing a glass film capable of collecting a thread-like peeled material without breaking the thread-like peeled material and interrupting the generation of the thread-like peeled material.

Solution to Problem

In order to solve the above-mentioned problems, according to one embodiment of the present invention, there is provided a method of manufacturing a glass film, comprising: a conveying step of conveying an elongated glass film along a longitudinal direction thereof; and a cutting step of irradiating the glass film with a laser beam from a laser irradiation apparatus while conveying the glass film through the conveying step, to thereby separate the glass film, the cutting step comprising generating a thread-like peeled material in a helical shape from an end portion of the separated glass film in a width direction, the thread-like peeled material having a width of 180 μm or more and 300 μm or less and a helical diameter of 80 mm or more and 200 mm or less.

By the method according to the embodiment of the present invention, in which the thread-like peeled material is generated in a helical shape in the cutting step and the thread-like peeled material is controlled to have predetermined dimensions during cutting of the glass film, the thread-like peeled material can be continuously formed without breaking the thread-like peeled material in a middle thereof and interrupting the generation of the thread-like peeled material. Specifically, the inventors of the present invention have made extensive investigations, and as a result, have found that, when the width of the thread-like peeled material is controlled to 180 μm or more and 300 μm or less, and the helical diameter of the thread-like peeled material formed into a helical shape is controlled to 80 mm or more and 200 mm or less, the thread-like peeled material can be collected without breaking the thread-like peeled material in a middle thereof and interrupting the generation of the thread-like peeled material. With this, by the method according to the embodiment of the present invention, the elongated glass film can be manufactured under a state of maintaining high quality on an end surface thereof.

In the method of manufacturing a glass film according to the embodiment of the present invention, the width of the thread-like peeled material is more preferably 200 μm or more and 270 µm or less, and the helical diameter of the thread-like peeled material is more preferably 90 mm or more and 150 mm or less.

In the method of manufacturing a glass film according to the embodiment of the present invention, the diameter of the laser beam to be radiated to the glass film is preferably 160 µm or more and 400 µm or less, more preferably 160 µm or more and 300 µm or less.

Advantageous Effects of Invention

According to the present invention, the thread-like peeled material can be collected without breaking the thread-like peeled material and interrupting the generation of the thread-like peeled material.

BRIEF DESCRIPTION OF DRAWINGS

FIG. 7 is a plan view for illustrating the apparatus for manufacturing a glass roll.

DESCRIPTION OF EMBODIMENTS

Now, embodiments of the present invention are described with reference to the drawings. In each of FIG. 1 to FIG. 5, an apparatus for manufacturing a glass film and a method of manufacturing a glass film using the manufacturing apparatus according to a first embodiment of the present invention are illustrated.

Figure 1:
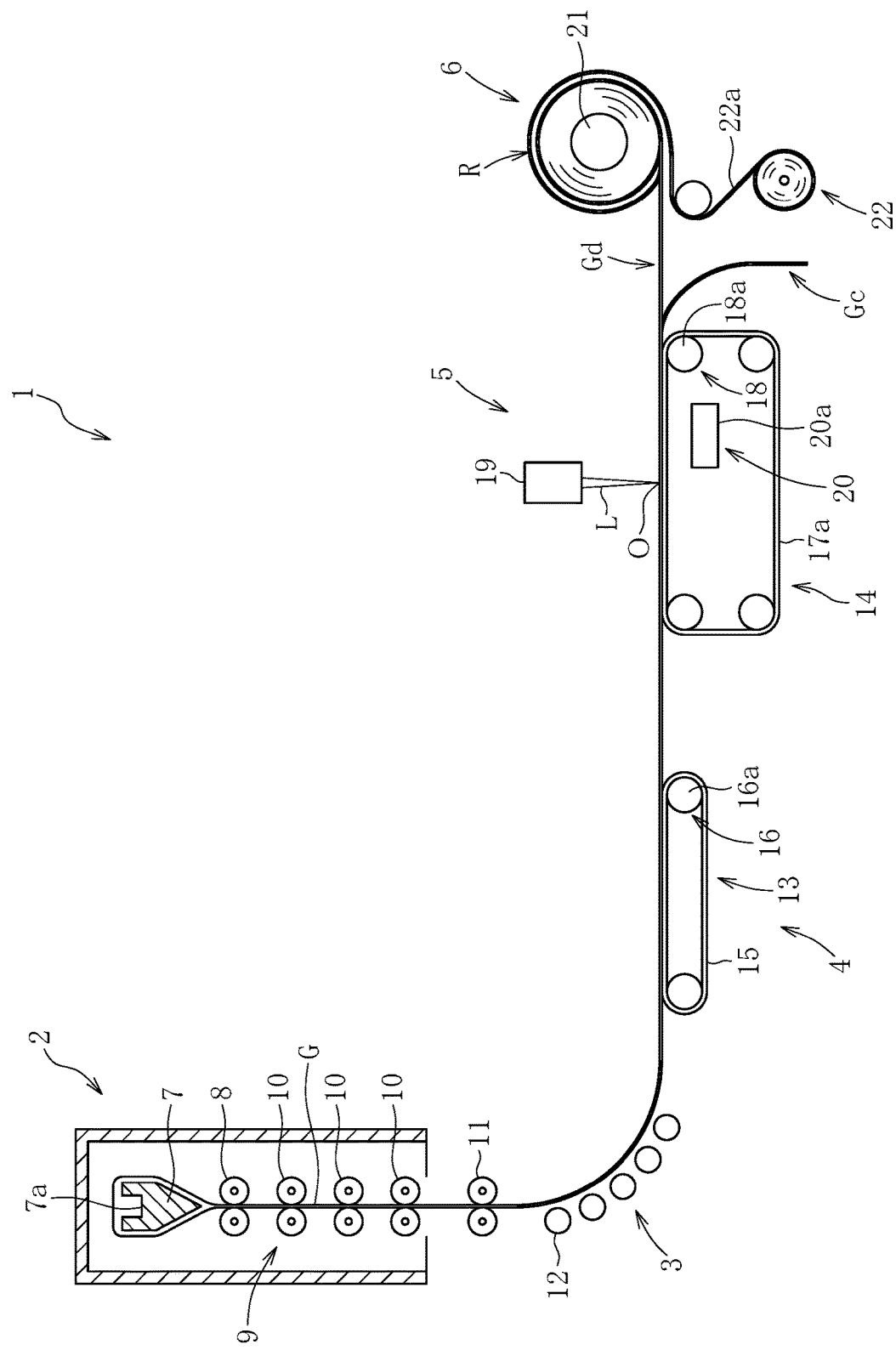
FIG. 1 is a side view for illustrating an overall configuration of an apparatus for manufacturing a glass roll according to a first embodiment.

FIG. 1 is a schematic side view for schematically illustrating an overall configuration of an apparatus for manufacturing a glass film. As illustrated in FIG. 1, a manufacturing apparatus 1 comprises: a forming portion 2 configured to form a glass film G; a direction conversion portion 3 configured to convert a traveling direction of the glass film G from a vertically downward direction to a lateral direction; a lateral conveying portion 4 configured to convey the glass film G in the lateral direction after the direction conversion; a cutting portion 5 configured to cut end portions (selvage portions) Ga and Gb of the glass film G in a width direction as non-product portions Gc while the glass film G is conveyed in the lateral direction with the lateral conveying portion 4; and a take-up portion 6 configured to take up a product portion Gd into a roll shape to form a glass roll R, the product portion Gd being obtained by cutting and removing the non-product portions Gc with the cutting portion 5. In this embodiment, the thickness of the product portion Gd is, but is not limited to, 300 µm or less, preferably 10 µm or more and 200 µm or less, more preferably 50 µm or more and 100 µm or less.

The forming portion 2 comprises: a forming body 7 having a substantially wedge shape in sectional view in which an overflow groove 7a is formed on an upper end portion thereof; edge rollers 8 arranged immediately below the forming body 7 and configured to sandwich molten glass overflowing from the forming body 7 from both front and back surface sides of the molten glass; and an annealer 9 arranged immediately below the edge rollers 8.

The forming portion 2 is configured to cause the molten glass overflowing from an upper portion of the overflow groove 7a of the forming body 7 to flow down along both side surfaces of the forming body 7 to be joined at a lower end of the forming body 7, to thereby form a molten glass in a film shape. The edge rollers 8 are configured to control shrinkage of the molten glass in a width direction to form the glass film G having a predetermined width. The annealer 9 is configured to perform strain removal treatment on the glass film G. The annealer 9 comprises annealer rollers 10 arranged in a plurality of stages in a vertical direction.

Support rollers 11 configured to sandwich the glass film G from both the front and back surface sides are arranged below the annealer 9. A tension for encouraging thinning of the glass film G is applied between the support rollers 11 and the edge rollers 8 or between the support rollers 11 and the annealer rollers 10 at any one position.

The direction conversion portion 3 is arranged at a position below the support rollers 11. In the direction conversion portion 3, a plurality of guide rollers 12 configured to guide the glass film G are arranged in a curved form. Those guide rollers 12 are configured to guide the glass film G, which has been conveyed in the vertical direction, in the lateral direction.

The lateral conveying portion 4 is arranged in a forward traveling direction with respect to (on a downstream side of) the direction conversion portion 3. The lateral conveying portion 4 comprises: a first conveying device 13; and a second conveying device 14. The first conveying device 13 is arranged on a downstream side of the direction conversion portion 3, and the second conveying device 14 is arranged on a downstream side of the first conveying device 13.

The first conveying device 13 comprises: an endless belt-like conveyor belt 15; and a driver 16 for the conveyor belt 15. The first conveying device 13 is configured to continuously convey the glass film G having passed through the direction conversion portion 3 to a downstream side by bringing an upper surface of the conveyor belt 15 into contact with the glass film G. The driver 16 comprises: a driving body 16a for driving the conveyor belt 15, such as a roller or a sprocket; and a motor (not shown) configured to rotate the driving body 16a.

Figure 2:
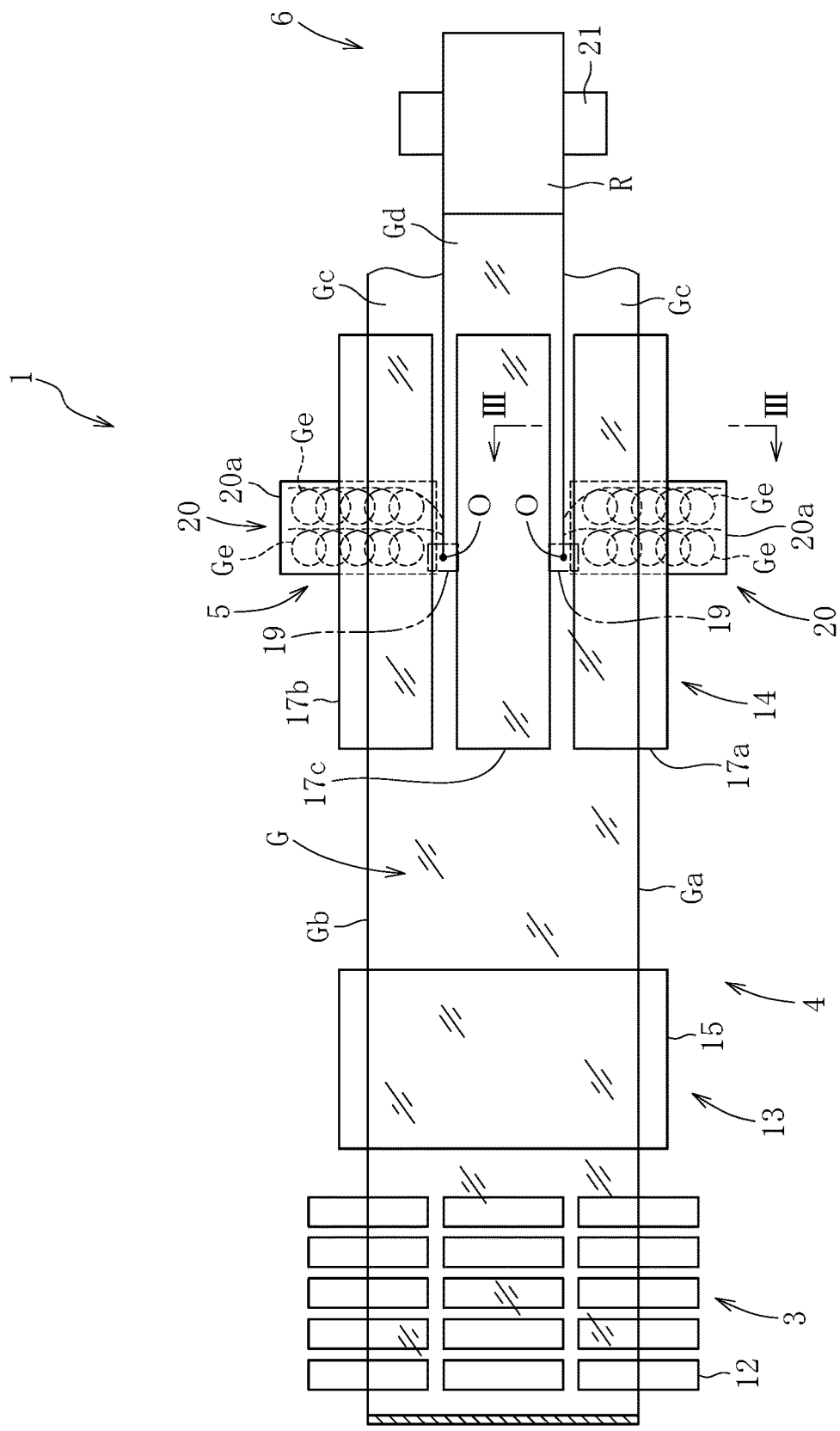
FIG. 2 is a plan view for illustrating a main portion of the apparatus for manufacturing a glass roll.

The second conveying device 14 comprises: a plurality of (in this example, three) conveyor belts 17a to 17c each configured to convey the glass film G; and a driver 18 for the conveyor belts 17a to 17c. As illustrated in FIG. 2, the conveyor belts 17a to 17c are formed in an endless belt shape, and include: the first conveyor belt 17a to be brought into contact with the one end portion Ga of the glass film G in the width direction; the second conveyor belt 17b to be brought into contact with the other end portion Gb of the glass film G in the width direction; and the third conveyor belt 17c to be brought into contact with a middle portion of the glass film G in the width direction. The driver 18 comprises: a driving body 18a for driving the conveyor belts 17a to 17c, such as a roller or a sprocket; and a motor (not shown) configured to rotate the driving body 18a.

As illustrated in FIG. 2, the conveyor belts 17a to 17c are spaced apart from one another in the width direction of the glass film G. With this, gaps are formed between the first conveyor belt 17a and the third conveyor belt 17c and between the second conveyor belt 17b and the third conveyor belt 17c.

Figure 3:
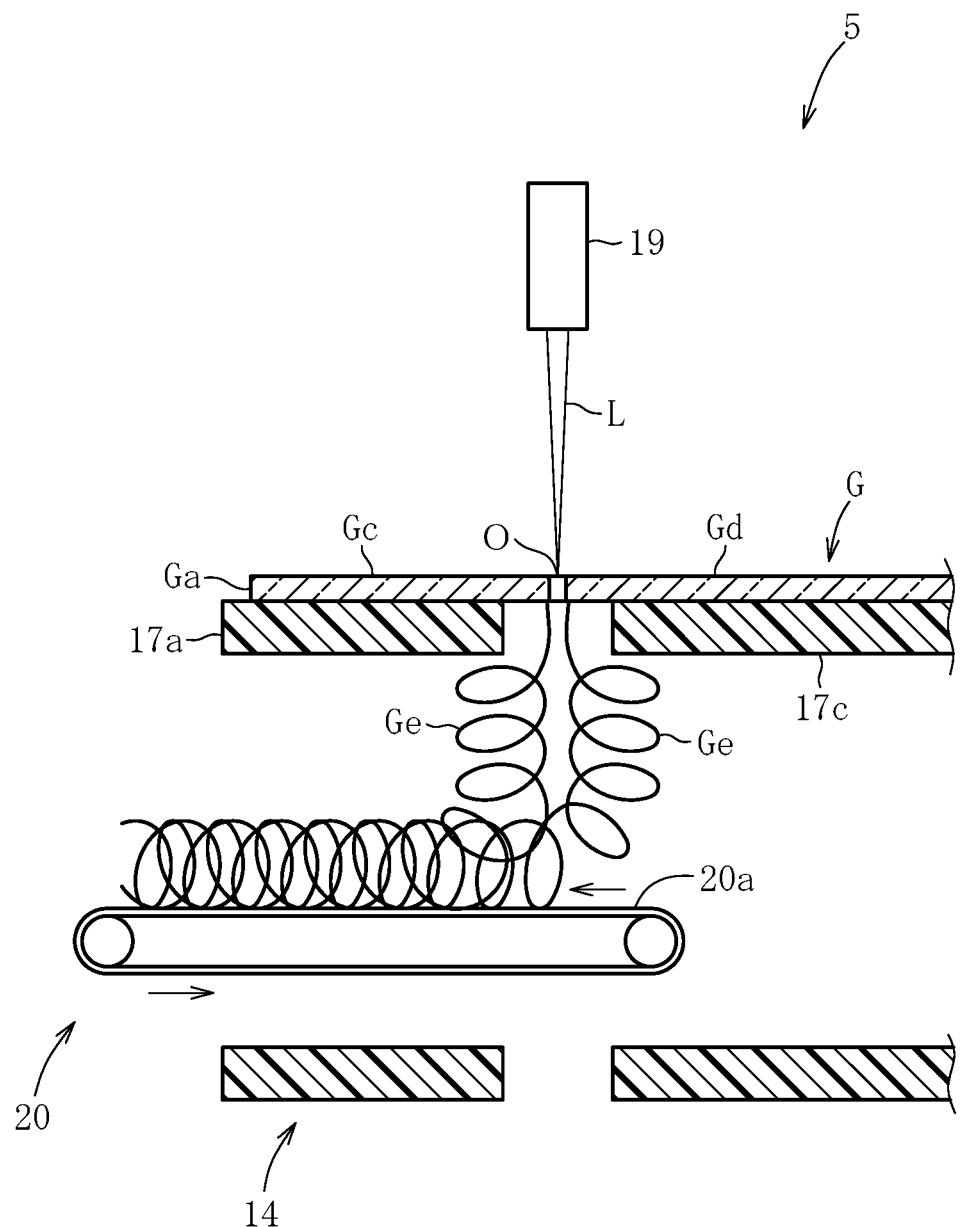
FIG. 3 is a sectional view taken along the line III-III of FIG. 2.

As illustrated in FIG. 1 to FIG. 3, the cutting portion 5 comprises: a laser irradiation apparatus 19 arranged at a portion above the second conveying device 14; and a plurality of collecting devices 20 each configured to collect a thread-like peeled material Ge generated when the glass film G is irradiated with a laser beam L from the laser irradiation apparatus 19.

The laser irradiation apparatus 19 has a configuration in which the laser beam L, such as a $CO_2$ laser, a YAG laser, or any other laser, is radiated downward. The laser beam L is radiated to a predetermined position (irradiation position) O of the glass film G. The irradiation diameter (diameter) of the laser beam L at the irradiation position O is preferably 160 µm or more and 400 µm or less, more preferably 160 µm or more and 300 µm or less.

The laser output of the laser irradiation apparatus 19 is, for example, 50 W or more and 200 W or less, but is not limited to the above-mentioned range. In addition, the output density of the laser beam L from the laser irradiation apparatus 19 is 500 $W/mm^2$ or more and 10,000 $W/mm^2$ or less, but is not limited to the above-mentioned range. When the output density, the thickness of the glass film G or the product portion Gd, and the conveying speed of the glass film G in the second conveying device 14 are represented by E, t (mm), and v (m/h), respectively, a relationship of E≥15 tv is preferably satisfied. In addition, the output density satisfies a relationship of preferably 50 tv>E≥15 tv, more preferably 40 tv≥E≥15 tv, most preferably 35 tv≥E≥15 tv. However, an upper limit value thereof is not limited thereto.

In this embodiment, two laser irradiation apparatus 19 are arranged so that both the end portions Ga and Gb of the glass film G in the width direction are cut (see FIG. 2). As illustrated in FIG. 2, the irradiation positions O with the laser beam L are set so as to correspond to the gap between the first conveyor belt 17a and the third conveyor belt 17c and the gap between the second conveyor belt 17b and the third conveyor belt 17c in the second conveyor device 14.

As illustrated in FIG. 2 and FIG. 3, the collecting devices 20 are arranged below the glass film G. The collecting devices 20 are formed of belt conveyors 20a. In this embodiment, two belt conveyors 20a corresponding to the end portions Ga and Gb of the glass film G are arranged. Each of the belt conveyors 20a is configured to convey the thread-like peeled material Ge in a direction perpendicular to the conveying direction (longitudinal direction) of the glass film G (in the width direction), that is, from the inward side to the outward side of the glass film G in the width direction.

Figure 4A:
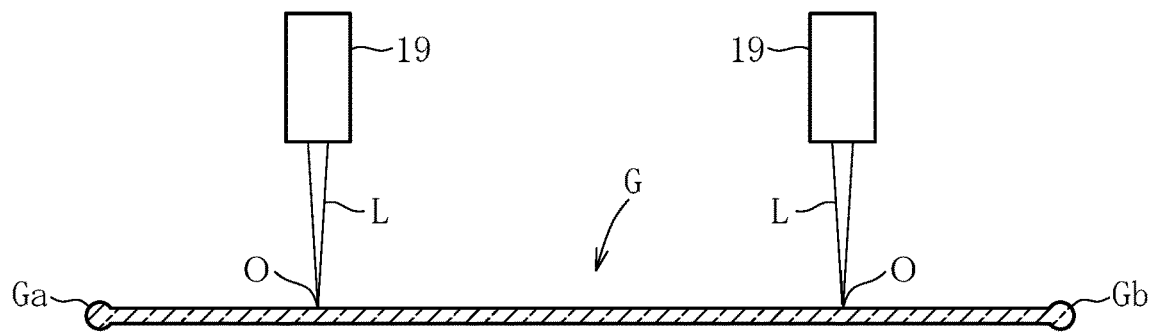
FIG. 4A is a view for illustrating a mechanism for the generation of a thread-like peeled material, and is a sectional view for illustrating a state in which a glass film is irradiated with a laser beam.
Figure 4B:
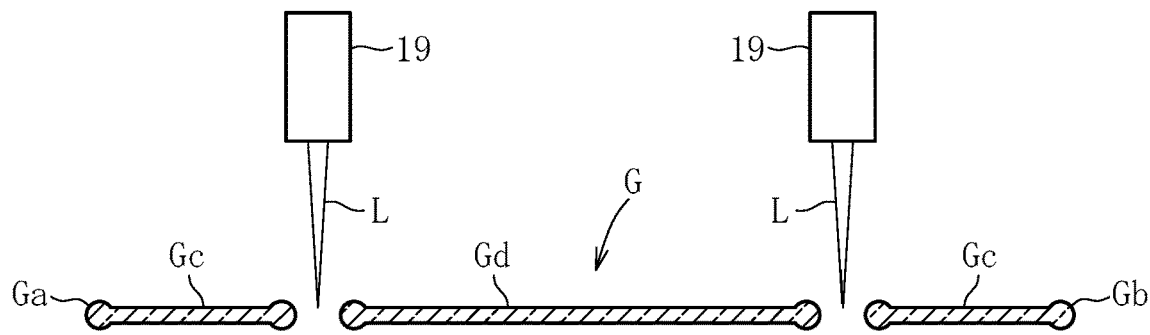
FIG. 4B is a view for illustrating the mechanism for the generation of the thread-like peeled material, and is a sectional view for illustrating a state in which the glass film is melt-cut through irradiation with the laser beam.

Here, a mechanism for the generation of the thread-like peeled material Ge is described with reference to FIG. 4 and FIG. 5. When the glass film G is irradiated with the laser beam L as illustrated in FIG. 4A, part of the glass film G is melt-cut by being heated with the laser beam L as illustrated in FIG. 4B. The glass film G is conveyed with the second conveying device 14, and hence the melt-cut portion is moved away from the laser beam L.

With this, the melt-cut portion of the glass film G is cooled. Through the cooling, a heat strain occurs in the melt-cut portion, and a stress resulting therefrom acts as a tensile force in a portion not having been melt-cut. By the action, as illustrated in FIG. 4C, the thread-like peeled material Ge is separated from each of an end portion of the non-product portion Gc in a width direction and an end portion of the product portion Gd in a width direction.

Figure 4C:
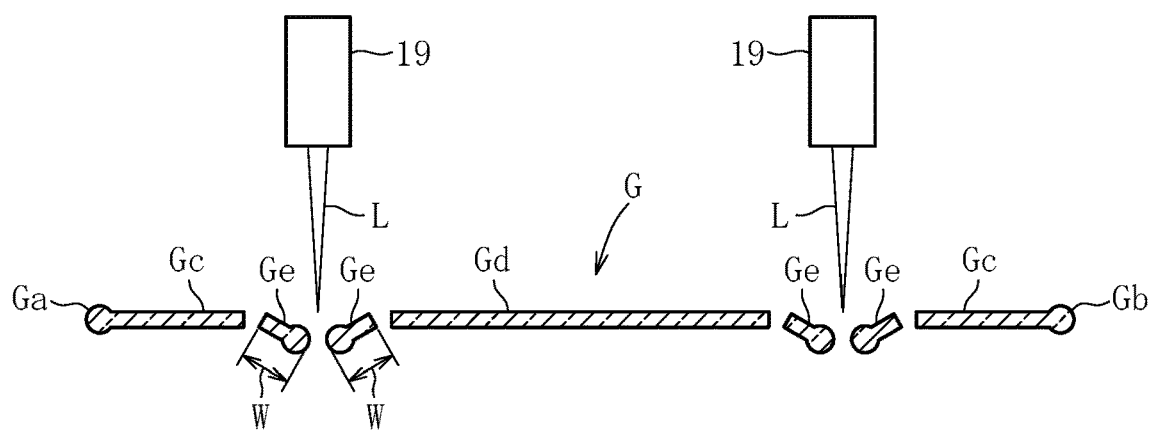
FIG. 4C is a view for illustrating the mechanism for the generation of the thread-like peeled material, and is a sectional view for illustrating a state in which the thread-like peeled material is generated from each of a product portion and a non-product portion.
Figure 5:
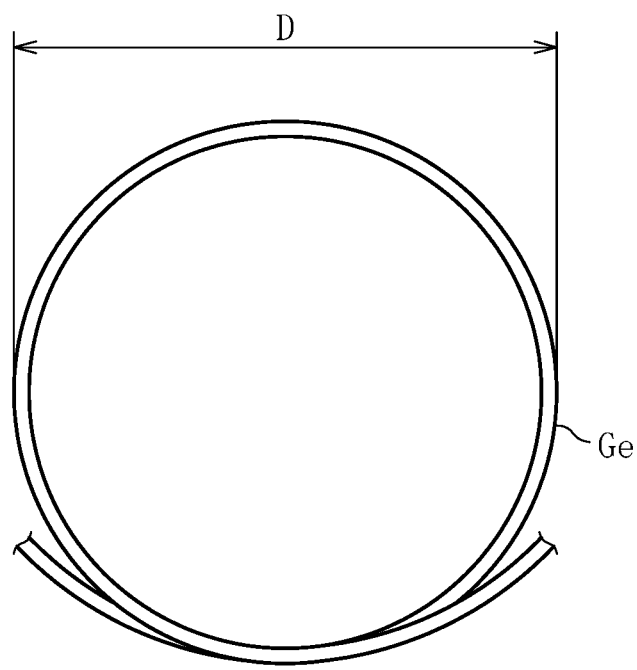
FIG. 5 is a plan view for illustrating part of the thread-like peeled material deformed into a helical shape.

The separated thread-like peeled material Ge moves downward under its own weight (see FIG. 4C). The width W of each thread-like peeled material Ge is preferably 180 µm or more and 300 µm or less, more preferably 200 µm or more and 270 µm or less.

The thread-like peeled material Ge is deformed into a helical shape after separated from the non-product portion Gc or the product portion Gd. As illustrated in FIG. 5, a helical diameter (outer diameter) D of the thread-like peeled material Ge is preferably 80 mm or more and 200 mm or less, more preferably 90 mm or more and 150 mm or less. The thread-like peeled material Ge takes on a bundled circular wire form when placed on a placement surface or the like, and hence the helical outer diameter D may be determined by placing several windings of the thread-like peeled material Ge thereon and measuring the maximum outer diameter.

The take-up portion 6 is arranged on a downstream side of the cutting portion 5 and the second conveying device 14. The take-up portion 6 comprises: a take-up roller 21; a motor (not shown) configured to rotationally drive the take-up roller 21; and a protective sheet supply portion 22 configured to supply a protective sheet 22a to the take-up roller 21. The take-up portion 6 is configured to take up the product portion Gd into a roll shape by rotating the take-up roller 21 with the motor while causing the protective sheet 22a fed from the protective sheet supply portion 22 to overlap the product portion Gd. The product portion Gd having been taken up forms the glass roll R.

A method of manufacturing the glass roll R with the manufacturing apparatus 1 having the above-mentioned configuration is described below. The method of manufacturing the glass roll R comprises: a forming step of forming the band-like glass film G with the forming portion 2; a conveying step of conveying the glass film G with the direction conversion portion 3 and the lateral conveying portion 4; a cutting step of cutting the end portions Ga and Gb of the glass film G in the width direction with the cutting portion 5; and a take-up step of taking up the product portion Gd with the take-up portion 6 after the cutting step.

In the forming step, molten glass overflowing from an upper portion of the overflow groove 7a of the forming body 7 in the forming portion 2 is caused to flow down along both side surfaces of the forming body 7 to be joined at a lower end of the forming body 7, to thereby form a molten glass in a film shape. At this time, the shrinkage of the molten glass in a width direction is controlled with the edge rollers 8, and thus the glass film G having a predetermined width is formed. After that, strain removal treatment is performed on the glass film G with the annealer 9 (annealing step). The glass film G having a predetermined thickness is formed through a tension applied by the support rollers 11.

In the conveying step, the conveying direction of the glass film G is converted to a lateral direction with the direction conversion portion 3, and the glass film G is conveyed to the take-up portion 6 on a downstream side with the conveying devices 13 and 14.

In the cutting step, while the glass film G is conveyed with the second conveying device 14, the glass film G is irradiated with the laser beam L from the laser irradiation apparatus 19 of the cutting portion 5, and both the end portions Ga and Gb of the glass film G in the width direction are cut. With this, the glass film G is separated into the non-product portions Gc and the product portion Gd. In addition, in the cutting step, the thread-like peeled materials Ge generated from the non-product portions Gc and the product portion Gd are collected with the collecting devices 20 (collecting step).

The non-product portions Gc are conveyed to a downstream side with the first conveyor belt 17a and the second conveyor belt 17b of the second conveying device 14, and collected on an upstream side of the take-up portion 6 with another collecting device not shown in the figures.

In the take-up step, the product portion Gd conveyed with the second conveying device 14 is taken up into a roll shape with the take-up roller 21 of the take-up portion 6 while the protective sheet 22a is supplied to the product portion Gd from the protective sheet supply portion 22. When the product portion Gd having a predetermined length is taken up with the take-up roller 21, the glass roll R is completed.

In the embodiment described above, the width W of the thread-like peeled material Ge is controlled to 180 μm or more and 300 μm or less, and the helical diameter D of the thread-like peeled material Ge is controlled to 80 mm or more and 200 mm or less, and hence the thread-like peeled material Ge can be collected by the collecting device 20 without breaking the thread-like peeled material Ge and interrupting the generation of the thread-like peeled material Ge. Besides, the diameter of the laser beam L to be radiated to the glass film G is set to 160 μm or more and 400 μm or less, and hence the thread-like peeled material Ge which is less liable to be broken can be generated. With this, the glass roll R having high quality on an end surface thereof can be manufactured.

Figure 6:
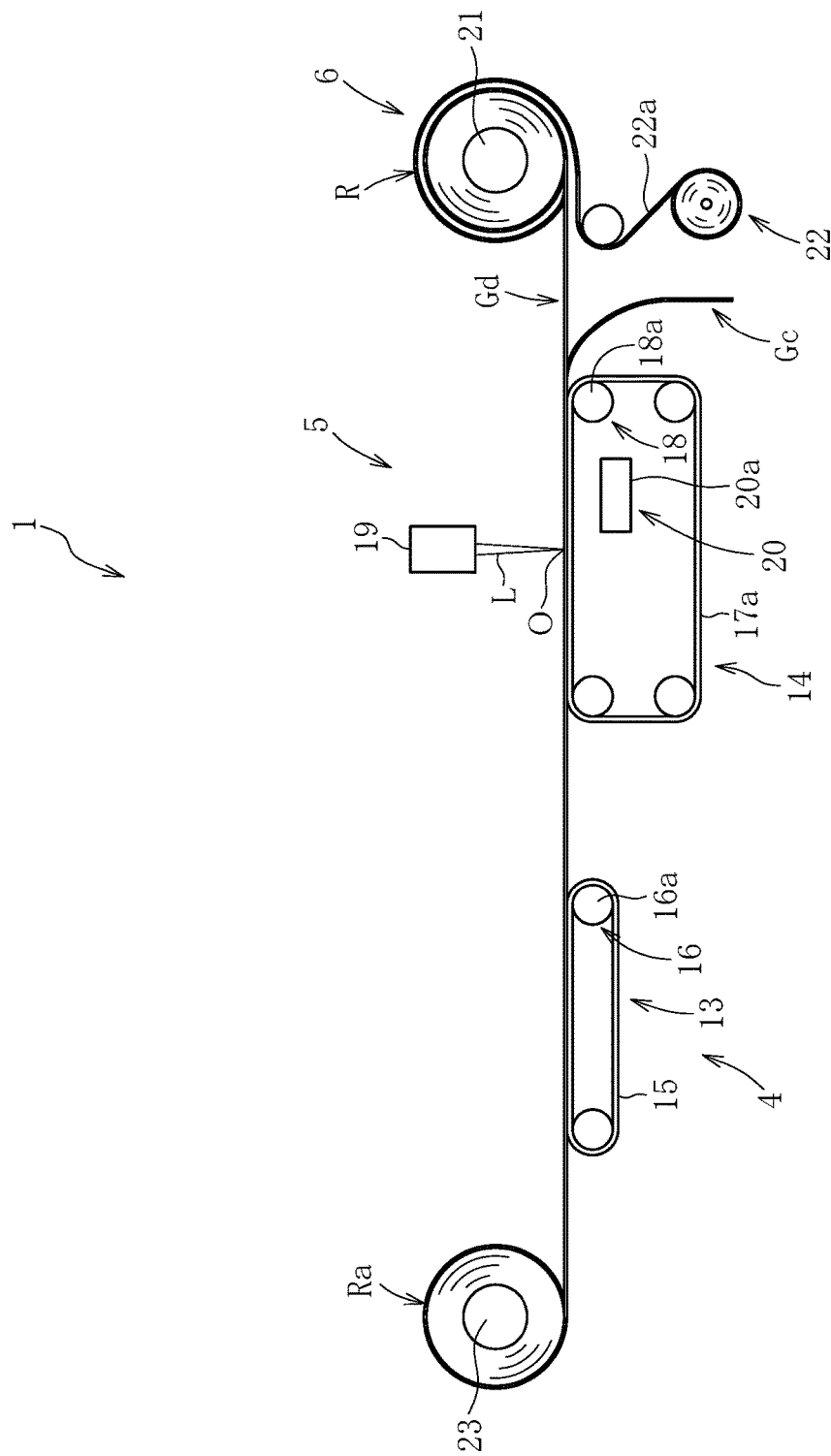
FIG. 6 is a side view for illustrating an overall configuration of an apparatus for manufacturing a glass roll according to a second embodiment.

In each of FIG. 6 and FIG. 7, an apparatus for manufacturing a glass film and a method of manufacturing a glass film using the manufacturing apparatus according to a second embodiment of the present invention are illustrated. While an example in which the glass film G is manufactured by an overflow down-draw method has been described in the first embodiment, an example in which a glass film G (glass roll R) is manufactured by a roll-to-roll process is described in this embodiment.

As illustrated in FIG. 6 and FIG. 7, a manufacturing apparatus 1 comprises, on the most upstream side, a glass roll starting material Ra in which a glass film G to be processed is formed into a roll shape instead of the forming portion 2 and the direction conversion portion 3 in the first embodiment. The glass roll starting material Ra is taken up by a supply roller 23. A conveying portion 4, a cutting portion 5, and a take-up portion 6 are arranged in the stated order on a downstream side of the glass roll starting material Ra as in the first embodiment. Those elements 4 to 6 have the same configurations as in the first embodiment.

A method of manufacturing the glass film G (glass roll R) in this embodiment comprises: a glass film supply step of drawing the glass film G to be processed from the glass roll starting material Ra and supplying the glass film G to a downstream side; a conveying step; a cutting step; and a take-up step. In the glass film supply step, the manufacturing apparatus 1 is configured to draw the glass film G to be processed from the glass roll starting material Ra and move the glass film G to be processed to a downstream side by rotating the supply roller 23. The subsequent conveying step, cutting step, and take-up step are the same as in the first embodiment.

In this embodiment, the glass film G to be processed may be separated into a plurality of glass films G in the cutting step, and part or all of the glass films G may each be used as a product. In this case, a plurality of take-up rollers 21 are arranged in the take-up portion 6 depending on the number of products to be manufactured.

The present invention is not limited to the configurations of the above-mentioned embodiments. In addition, the action and effect of the present invention are not limited to those described above. The present invention may be modified in various forms within the range not departing from the spirit of the present invention.

EXAMPLES

Examples according to the present invention are described below, but the present invention is not limited to these Examples. The inventors of the present invention made a test for confirming the effects of the present invention. In the test, a glass film having a length of 100 m was melt-cut with a laser beam through use of the manufacturing apparatus of the first embodiment illustrated in FIG. 1, and whether or not a thread-like peeled material generated from a product portion was broken, and whether or not the generation of the thread-like peeled material from the product portion was interrupted were confirmed. In addition, in each of Examples 1 to 19 and Comparative Examples 1 to 6, in which the conditions of the thickness t of the glass film, the conveying speed v of the glass film, the irradiation diameter (beam diameter) of the laser beam, and the output and output density of the laser beam were varied, the width and helical diameter (winding diameter) of the thread-like peeled material were measured. The helical diameter of the thread-like peeled material was measured by, after completion of cutting of the glass film, placing the collected thread-like peeled material on a measurement table without deforming the shape of the thread-like peeled material.

The test results are shown in Table 1 to Table 3. In Table 1 to Table 3, a case in which a product (glass roll) was able to be manufactured without breaking the thread-like peeled material and interrupting the generation of the thread-like peeled material was evaluated as satisfactory (indicated by Symbol "○"), and a case in which the thread-like peeled material was broken during manufacture of a product, the generation of the thread-like peeled material from a product portion was interrupted, or the thread-like peeled material was not generated was evaluated as poor (indicated by Symbol "×").

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Thickness t (mm) | 0.1 | 0.1 | 0.1 | 0.1 | 0.1 | 0.1 | 0.1 | 0.1 | 0.05 | 0.05 |
| Speed v (m/h) | 480 | 480 | 480 | 480 | 480 | 480 | 480 | 480 | 960 | 960 |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Output (W) | 200 | 200 | 200 | 200 | 100 | 100 | 100 | 100 | 200 | 100 |
| Beam diameter (μm) | 160 | 200 | 300 | 400 | 160 | 200 | 300 | 400 | 200 | 300 |
| Output density E (W/mm$^2$) | 9,952 | 6,369 | 2,831 | 1,592 | 4,976 | 3,185 | 1,415 | 796 | 6,369 | 1,415 |
| t × v | 48 | 48 | 48 | 48 | 48 | 48 | 48 | 48 | 48 | 48 |
| E/(t × v) | 207.3 | 132.7 | 59.0 | 33.2 | 103.7 | 66.3 | 29.5 | 16.6 | 132.7 | 29.5 |
| Width of peeled material (μm) | 190 | 224 | 210 | 250 | 200 | 205 | 218 | 238 | 240 | 235 |
| Winding diameter of peeled material (mm) | 95 | 115 | 125 | 169 | 90 | 109 | 117 | 175 | 133 | 124 |
| Evaluation | ○ | ○ | ○ | ○ | ○ | ○ | ○ | ○ | ○ | ○ |

TABLE 2

|  | Example 11 | Example 12 | Example 13 | Example 14 | Example 15 | Example 16 | Example 17 | Example 18 | Example 19 |
|---|---|---|---|---|---|---|---|---|---|
| Thickness t (mm) | 0.05 | 0.05 | 0.05 | 0.05 | 0.05 | 0.1 | 0.1 | 0.1 | 0.1 |
| Speed v (m/h) | 600 | 600 | 600 | 600 | 600 | 660 | 660 | 660 | 660 |
| Output (W) | 50 | 50 | 50 | 100 | 200 | 280 | 240 | 170 | 280 |
| Beam diameter (μm) | 160 | 220 | 350 | 200 | 400 | 300 | 300 | 300 | 400 |
| Output density E (W/mm$^2$) | 2,488 | 1,316 | 520 | 3,185 | 1,592 | 3,963 | 3,397 | 2,406 | 2,229 |
| t × v | 30 | 30 | 30 | 30 | 30 | 66 | 66 | 66 | 66 |
| E/(t × v) | 82.9 | 43.9 | 17.3 | 106.2 | 53.1 | 60.0 | 51.5 | 36.5 | 33.8 |
| Width of peeled material (μm) | 195 | 201 | 198 | 220 | 255 | 250 | 225 | 260 | 294 |
| Winding diameter of peeled material (mm) | 92 | 95 | 98 | 123 | 144 | 100 | 90 | 85 | 132 |
| Evaluation | ○ | ○ | ○ | ○ | ○ | ○ | ○ | ○ | ○ |

TABLE 3

|  | Comparative Example 1 | Comparative Example 2 | Comparative Example 3 | Comparative Example 4 | Comparative Example 5 | Comparative Example 6 |
|---|---|---|---|---|---|---|
| Thickness t (mm) | 0.1 | 0.1 | 0.1 | 0.1 | 0.1 | 0.1 |
| Speed v (m/h) | 480 | 480 | 480 | 480 | 660 | 480 |
| Output (W) | 200 | 100 | 100 | 50 | 170 | 140 |
| Beam diameter (μm) | 150 | 150 | 500 | 300 | 150 | 440 |
| Output density E (W/mm$^2$) | 11,323 | 5,662 | 510 | 708 | 9,625 | 921 |
| t × v | 48 | 48 | 48 | 48 | 66 | 48 |
| E/(t × v) | 235.9 | 118.0 | 10.6 | 14.7 | 145.8 | 19.2 |
| Width of peeled material (μm) | 202 | 193 | 802 | — | 204 | 318 |
| Winding diameter of peeled material (mm) | 72 | 70 | — | — | 76 | 172 |
| Evaluation | x | x | x | x | x | x |

As shown in Table 1 and Table 2, in each of Examples 1 to 19, a product was able to be suitably manufactured without breaking the thread-like peeled material and interrupting the generation of the thread-like peeled material. As shown in Table 3, when the helical diameter of the thread-like peeled material was less than 80 mm (see Comparative Examples 1, 2, and 5), the thread-like peeled material was broken in a middle thereof, or the generation of the thread-like peeled material was interrupted. As shown in Table 3, when the width of the thread-like peeled material exceeded 300 μm (see Comparative Example 6), the thread-like peeled material was broken in a middle thereof, or the generation of the thread-like peeled material was interrupted. As shown in Table 3, when the width of the thread-like peeled material significantly exceeded 300 μm (see Comparative Example 3), the thread-like peeled material was not able to be formed into a helical shape, and was broken into short pieces. In addition, when the irradiation diameter of the laser beam was less than 160 μm (see Comparative Examples 1, 2, and 5) or exceeded 400 μm (see Comparative Examples 3 and 6), the thread-like peeled material was broken in a middle thereof, or the generation of the thread-like peeled material was interrupted. In addition, in Comparative Example 4, the thread-like peeled material was not generated.

REFERENCE SIGNS LIST

19 laser irradiation apparatus
D helical diameter
G glass film
Ge thread-like peeled material
L laser beam

The invention claimed is:
1. A method of manufacturing a glass film, the method comprising:
a conveying step of conveying an elongated glass film along a longitudinal direction thereof; and a cutting step of irradiating the glass film with a laser beam having a spot size diameter of 160 μm to 400 μm from a laser irradiation apparatus while conveying the glass film through the conveying step, to thereby separate the glass film, wherein the cutting step comprises generating a thread-like peeled material in a helical shape with a width of 180 μm to 300 μm from an end portion of the separated glass film by irradiating the laser beam to the glass film such that an output density E (W/mm$^2$) of the laser beam, a thickness t (mm) of the glass film, and a conveying speed v (m/h) of the glass film satisfy a relationship defined in the following equation (1), $$40tv \geq E \geq 15tv \quad \ldots \quad (1),$$ and the cutting step comprises generating the thread-like peeled material in the helical shape with a helical diameter of 80 mm to 200 mm by accumulation of heat-strain tensile forces during cooling, after irradiating the glass film.

2. The method of manufacturing a glass film according to claim 1, wherein the diameter of the laser beam to be radiated to the glass film is 160 μm to 300 μm.

3. The method of manufacturing a glass film according to claim 1,
wherein the width of the thread-like peeled material is 200 μm to 270 μm, and
wherein the helical diameter of the thread-like peeled material is 90 mm to 150 mm.

4. The method of manufacturing a glass film according to claim 2,
wherein the width of the thread-like peeled material is 200 μm to 270 μm, and
wherein the helical diameter of the thread-like peeled material is 90 mm to 150 mm.

* * * * *